United States Patent
Christ et al.

(10) Patent No.: US 8,100,474 B2
(45) Date of Patent: Jan. 24, 2012

(54) DEVICE FOR ATTACHING A CHILD CAR SEAT TO AN ANCHOR MEMBER OR ANCHOR BRACKET OF THE BODY OF A VEHICLE

(75) Inventors: Wolfgang Christ, Köngen (DE); Hans-Peter Hoffmann, Marktleugast (DE); Jens Pöhner, Steinbach (DE)

(73) Assignee: Recaro GmbH & Co. KG, Kirchem/Teck (DE)

( * ) Notice: Subject to any disclaimer, the term of this patent is extended or adjusted under 35 U.S.C. 154(b) by 189 days.

(21) Appl. No.: 12/384,351

(22) Filed: Apr. 3, 2009

(65) Prior Publication Data
US 2009/0261640 A1 Oct. 22, 2009

(30) Foreign Application Priority Data
Apr. 17, 2008 (DE) .................. 20 2008 005 361 U

(51) Int. Cl.
*A47D 1/10* (2006.01)

(52) U.S. Cl. ...................................................... 297/253
(58) Field of Classification Search ................... 297/253
See application file for complete search history.

(56) References Cited

U.S. PATENT DOCUMENTS

| | | | | |
|---|---|---|---|---|
| 6,017,087 | A * | 1/2000 | Anthony et al. | 297/253 X |
| 6,425,632 | B1 * | 7/2002 | Anthony et al. | 297/253 X |
| 6,820,310 | B2 * | 11/2004 | Woodard et al. | 297/253 X |
| 6,962,394 | B2 * | 11/2005 | Anthony et al. | 297/253 |
| 7,328,946 | B2 * | 2/2008 | Hendrikus Van Montfort et al. | 297/253 |
| 2007/0069562 | A1 * | 3/2007 | Van Montfort et al. | 297/253 |
| 2007/0284924 | A1 * | 12/2007 | Gold et al. | 297/253 |

FOREIGN PATENT DOCUMENTS

| | | |
|---|---|---|
| DE | 198 00 072 | 7/1999 |
| DE | 103 51 753 | 6/2005 |
| EP | 1 214 221 | 6/2002 |

* cited by examiner

*Primary Examiner* — Rodney B White
(74) *Attorney, Agent, or Firm* — Pandiscio & Pandiscio

(57) ABSTRACT

A device for releasably attaching a child seat to an anchor member connected to a body of a vehicle.

16 Claims, 5 Drawing Sheets

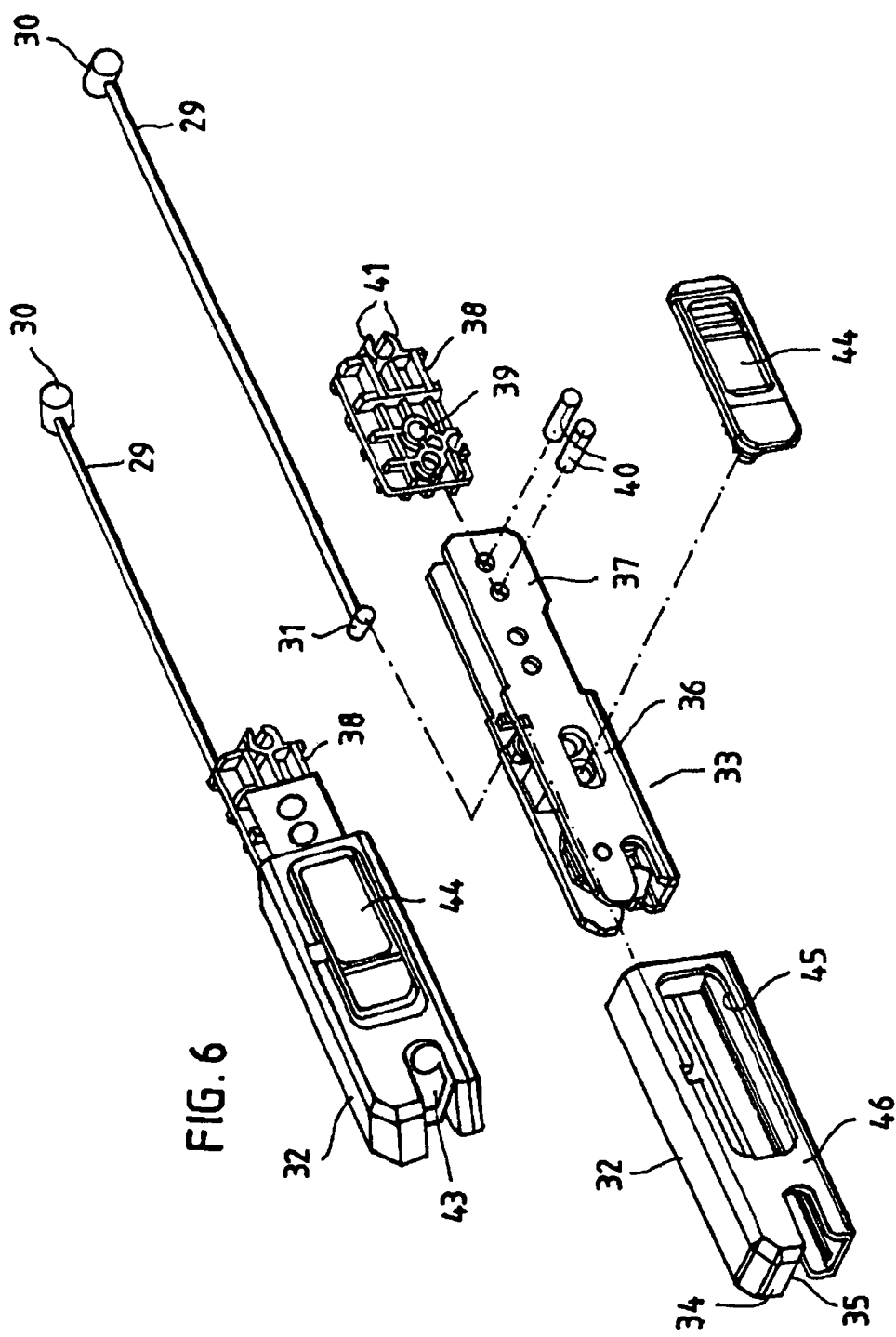

DEVICE FOR ATTACHING A CHILD CAR SEAT TO AN ANCHOR MEMBER OR ANCHOR BRACKET OF THE BODY OF A VEHICLE

The invention is directed to a device for preferably releasably attaching a child seat to at least one anchor member or cross member of an anchor bracket (a so-called ISOFIX adapter) connected to the body of a vehicle, which member extends transversely to the direction of travel, said device comprising a device for securing to and/or integration with the child seat ("fixing device") and at least one device for positively embracing a vehicle-body-associated anchor member ("anchoring device") in such a way that radial movement of the child seat in relation to said anchor member or cross member of an anchor bracket is utterly impossible and axial movement is possible at most within narrow limits.

Child car seats serve the purpose of restraining the child safely in a vehicle, even during an accident, and of thereby limiting the forces exerted on the child to the lowest possible levels. Seats for small children often have their own seat belts by which the child can be firmly strapped into the seat concerned. With seats for older children, the belt already present in the vehicle is often used instead, so the child seat and the restraint system are independent systems. And this used to be relatively unproblematic back when the vehicle's own restraint system was used to fasten the child seat. A safety belt installed in a vehicle usually has an automatic winding device that yields to slow movements and allows the belt to unwind, but in the event of a violent deceleration quickly switches to a locked state and prevents the belt from unwinding any further. Now, before completely switching to the locked state in response to a sudden deceleration of the vehicle, and until the state of maximum tautness is reached, the vehicle belt does loosen by a few centimeters, and the child moves forward relative to the vehicle by this amount. But at the same time, the child seat anchored by this same belt also executes this linear forward motion, so no play that the child could slip through opens up between the belt and the child seat. Over the past few years, however, a growing number of child seats have been attached to so-called ISOFIX anchorages, which allow them, as their only movement play, to pivot about an axis extending transversely to the direction of travel, i.e., the connecting line between the two ISOFIX anchorages. In a head-on collision, seats anchored in this manner do not follow the forward linear motion of the child, but instead pivot forward under the effect of the backrest of the child seat, whose forwardly directed inertia causes a torque moment and forces the seating surface down into the soft upholstery of the vehicle's seat. Thus, while the belt slackens forwardly to a limited extent, the seating surface yields in a downward direction, causing a very large gap to open up in the region of the child's pelvis right at this crucial moment. It has been found that, as a result, the child is not reliably held fast, but slips downward in relation to the belt and may even slide right out from under it. When the belt then goes taut and prevents any further motion of the child, it no longer extends across the child's lap and his or her chest and shoulder, but rather across the abdomen and the neck, respectively, potentially resulting in to considerable internal injuries.

These disadvantages of the prior art have given rise to the problem initiating the invention, that of devising an arrangement which ensures that in a serious accident a child cannot slip out from between a belt of the vehicle and a seat attached by means of an ISOFIX adapter.

This problem is solved, in a device of the above kind, by the fact that the fixing device and at least one anchoring device are disposed on and/or in mutually separate parts, particularly tubes, which, on the one hand, can be fitted together, particularly mated together, for normal use in such a way that relative motion between the two connecting parts is limited to the play of the fitted connection, it being provided that said connection is able to come apart under a force overload and that said mutually separate parts, particularly tubes, are additionally connected inseparably to each other by a flexible but not stretchable connecting part, such that when the fitted connection releases, they are capable of relative motion within a different perimeter than in the fitted-together state, this expanded relative motion nevertheless being limited by the free length of the flexible connecting part.

The fitted connection in this case serves to immovably secure the child seat during "normal" driving, i.e., as long as no accident or sudden deceleration occurs. In precisely that kind of emergency, however, the mated connection releases and only the flexible connection remains intact. The child seat is thus given the ability to move a distance equal to the free length of this flexible connection. The seat utilizes this sudden degree of freedom of movement for forward linear motion within the vehicle, and thus follows the movement of the child until he or she is held firm by the ultimately taut belt. As a result, no gap opens up between the child seat and the vehicle's lap belt: said belt remains in the intended position with respect to the child, that is, in front of the child's pelvis, and the shoulder belt also remains over the shoulder and does not wind up on the child's neck. As a result of the flexible element, the child seat is always able to follow the child under such circumstances, i.e., even in an oblique collision, when the child moves not only forward, but also in a lateral direction. The free length of the flexible connecting part is preferably defined on the basis of the connecting part when taut or stretched out straight, with the fitted connection released, and corresponds to the distance between the exit or detachment points of the flexible connecting part from the two joined-together parts. If these exit points are adjacent in the fitted-together state, this free length defines the radius of the additional mobility of the fitted connection between its closed and released states.

It has proven favorable for the flexible connecting part to have an elongate shape, for example in the form of a wire, particularly in the form of a steel wire. Such a flexible tensioning means, which is suitable for absorbing and controlling tensile forces, thus meets all the demands imposed on this part. The possible relative motion between the anchoring device and the fixing device is consequently limited to a roughly spherical space whose radius is approximately equal to the free length of the tensioning means.

The invention recommends that the flexible connecting part be provided at one or preferably both ends with thickening(s) which is/are secured to a fixing device and/or at least one anchoring device. These thickened regions can be used, for example, for positive anchorage at a narrow or tight passage that can be traversed by the tensioning means, but not by the thickenings located at its end or ends.

It has proven favorable for the flexible connecting part to extend within the mated connection. In the mated state, it is there protected against damage and also receives a degree of guidance, such that in an emergency—when the mated connection separates—the intact and precisely guided tensioning means can go into action to quickly absorb and inhibit the initially free movement of the child seat.

Further advantages are gained by having the flexible connecting part extend between the plug part and the socket part. The space in question is a clearance that remains between the mutually contacting or adjacent mating means in their mated state, particularly in the radial direction, with reference to the mating direction. The tensioning means could also, of course, extend right on through the plug part to its free end; in such cases, however, the protruding plug part would be subject to buckling if subjected to lateral forces and would therefore have to be made very robust. The tensioning means preferably extends within the above-indicated clearance either above or below the plug part, where it is able to move largely freely to either side; an upward or downward movement, by contrast, is less crucial, since in such cases, for example, the anchoring part can pivot away about the axis of the ISOFIX member extending transversely to the direction of travel.

The invention can be developed further by having the flexible connecting part be guided as a loop within at least one of the two mated-connection parts. A loop constitutes a defined means of "folding away" the tensioning means when it is not in use—i.e., when the mated connection is intact and the tensioning means is slack. At the same time, a single loop (without any knots or the like) allows the tensioning means to be pulled out completely and frictionlessly until it has reached its taut state.

The invention is further distinguished by the fact that the socket part and/or the plug part has an overall angular cross section, preferably an approximately quadrangular cross section. Reciprocal rotation about the axis of the mating direction is thus impossible; this measure also contributes to orderly conditions inside the mated connection, and prevents, for example, twisting of the unused tensioning means.

Preferably in the region of the free end of the plug part, there can be an undercut element, which, when the parts are mated together, snaps together with a counterpart inside the other mating means, preferably the socket part. This snap coupling, besides creating a roughly directional guiding action between the mated-together elements, generates an additional (limited) linear force which opposes, with a force of defined magnitude, the pulling apart of the mated elements; only when this force limit is exceeded by an external force—during an accident, for example—does the mated connection release, and the tensioning means takes over the task of restraining the child seat.

If the undercut element consists of a (limitedly) elastically resilient or limitedly bendable or deformable material, preferably of plastic, then the force limit of the mated connection is defined by the force required to induce such bending or deformation of the undercut element and release the positive lock that forms the snap coupling.

A suitable counterpart to the undercut element, preferably disposed inside the socket part, is, for example, a crosspin that passes therethrough. Such a crosspin can be made of a rigid and/or stiff material, for example of a tough metal such as iron or steel, since it is not intended to deform.

The plug part could, of course, be provided either on the anchoring device or on the fixing device and engage in the respective other device to mate them together; preferably, however, it is disposed on the anchoring device and extends therefrom, and thus does not interfere with the ISOFIX anchoring mechanism.

In the context of such an ISOFIX anchoring mechanism, preferably a movable, particularly pivotable, hook-shaped part is provided to engage behind a vehicle-associated anchor member or cross member of an anchor bracket, which member extends transversely to the direction of travel. At all times, but especially during an accident, this hook-shaped part, in cooperation with a vehicle-associated ISOFIX member, is responsible for preventing the child seat from spontaneously (completely) detaching from the anchorage.

That being the case, a movable, particularly pivotable, hook-shaped part of the anchoring device should have two stable states, i.e., on the one hand, the state of being snapped onto a member, and, on the other hand, a state in which it is pivoted backward and detached therefrom. In a preferred embodiment, the hook-shaped part is capable of pivoting between two different states: on the one hand, the pivoted-in state, where it forms—preferably within a slot that embraces the member concerned—the positive anchorage, and the pivoted-away state, in which it is pivoted out of or away from the slot provided to embrace a vehicle-associated member, so that the anchoring mechanism can be detached from the ISOFIX member.

It is up to at least one spring element to keep one or both states of the movable, particularly pivotable, hook-shaped part stable, by exerting a bias. This spring element should be so arranged that only labile or frankly unstable states exist between two stable end states corresponding to the pivoted-in state and the pivoted-away state, so the mechanism is constantly forced to opt for one or the other of the two stable end states.

In addition, the anchoring device should be provided with an actuating element whose actuation renders the state of being snapped onto a bracket unstable, with the result that said movable, particularly pivotable, hook-shaped part pivots backward and detaches from an anchor member. When this element is actuated, therefore, one of the two initially stable end states, particularly the pivoted-in state of the anchorage, becomes unstable, and the hook-shaped element therefore pivots into the only remaining stable state, i.e., into the state of being open or pivoted out of a slot, and the child seat can then be detached from the ISOFIX member.

Due to the elongate shape of the anchoring or mating device of the ISOFIX adapter, it is therefore expedient to configure the actuating element as a sliding element, which preferably can be slid in the longitudinal direction of said mating device, i.e., in the mating direction. A particularly operation-friendly embodiment is characterized by the fact that the actuating element can be slid forward relative to the anchoring device approximately in the direction of travel.

The respective attachment points of two anchoring devices can be connected to each other by a cross member. In an accident, after one mated connection releases, such a connection between these two parts will subject the remaining one to an additional force, so that that one, as well, is compelled to release, and the child seat as a whole becomes free until the two tensioning means limit its motion.

The cross member can be embraced by at least one tube, sleeve or the like, particularly in the region between the two anchoring devices. A pivot axis therefore exists between the united fixing devices and the child seat itself, making it possible, for example even when the mated connection is intact, for the seat to move back and forth without having to tilt forward, as it would inevitably do if there were just one pivot axis in the region of the ISOFIX members.

At least one tube, sleeve or the like embracing the cross member can be fastened to the child seat by means of one or preferably two radially projecting fastening elements on said tube, sleeve or the like. Such fastening means could be fastened to the child seat for example by means of screws, bolts or the like.

According to the teaching of the invention, however, at least one fastening element is configured as a toothed rack. A toothed rack can be fixed undisplaceably in its longitudinal direction by means of an element disposed on the child seat that engages in at least one intertooth space of the toothed rack and thus renders longitudinal displacement impossible.

Finally, the invention is distinguished by a snap-fit element, disposed on the child seat, that can be pivoted or slid into the tooth region of at least one toothed rack. Conversely, such a movably mounted or guided snap-in element can also be moved out of or away from the engaged position: the toothed rack(s) is/are released by the child seat to a sufficient extent to permit reciprocal linear displacement in the longitudinal direction of the toothed rack(s) until the snap-in element is brought back into engagement at an(other) position of the toothed rack. The length of the ISOFIX mechanism can be adjusted in this way, particularly in order to adjust the child seat to an optimum distance from the backrest cushion of the vehicle seat, regardless of the particular circumstances.

Further features, details, advantages and effects based on the invention will emerge from the following description of a preferred embodiment of the invention and by reference to the drawing. Therein:

FIG. 6 shows a component from FIG. 5 from another perspective; and

FIG. 7 is an exploded representation of the component from FIG. 6.

Figure 1:
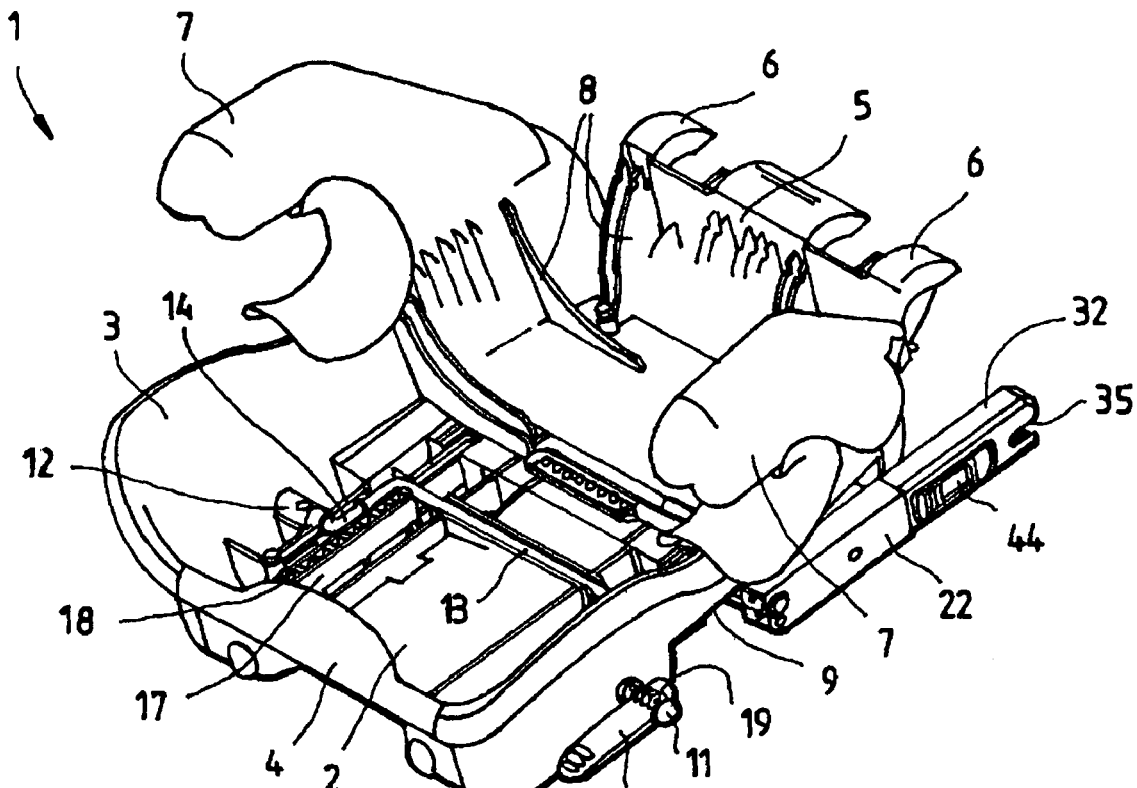
FIG. 1 is a perspective view of the frame of the bottom section of a child seat.
Figure 2:
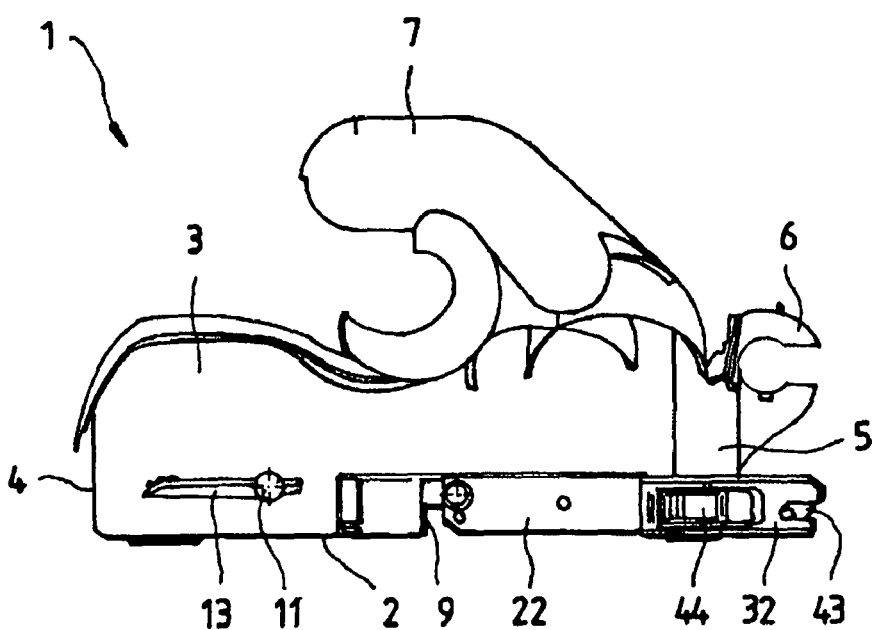
FIG. 2 is a side view of FIG. 1.
Figure 3:
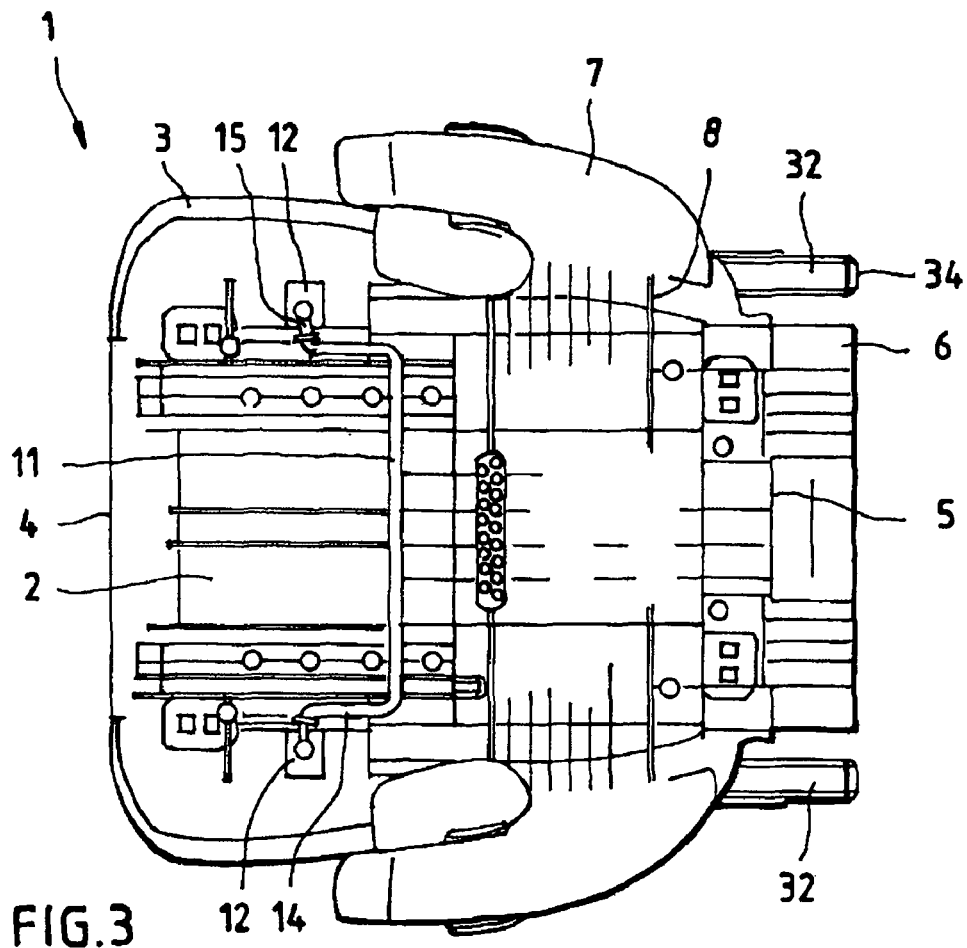
FIG. 3 is a plan view of FIG. 1.

FIGS. 1 to 3 provide an overview of the construction of the frame bottom section 1 of a child seat. Apparent are an approximately planar bottom part 2 with upward-extending side cheeks 3, front edge 4 and back edge 5 with receptacles 6 for a pivot shaft (not shown) that extends transversely to the direction of travel and by means of which the backrest is pivotably connected to the seating surfaces/bottom section 1. A load-bearing armrest part 7 is formed onto each side cheek 3. Struts 8 stabilize the seating surfaces/bottom section 1, which is injection-molded from plastic in one piece.

Figure 4:
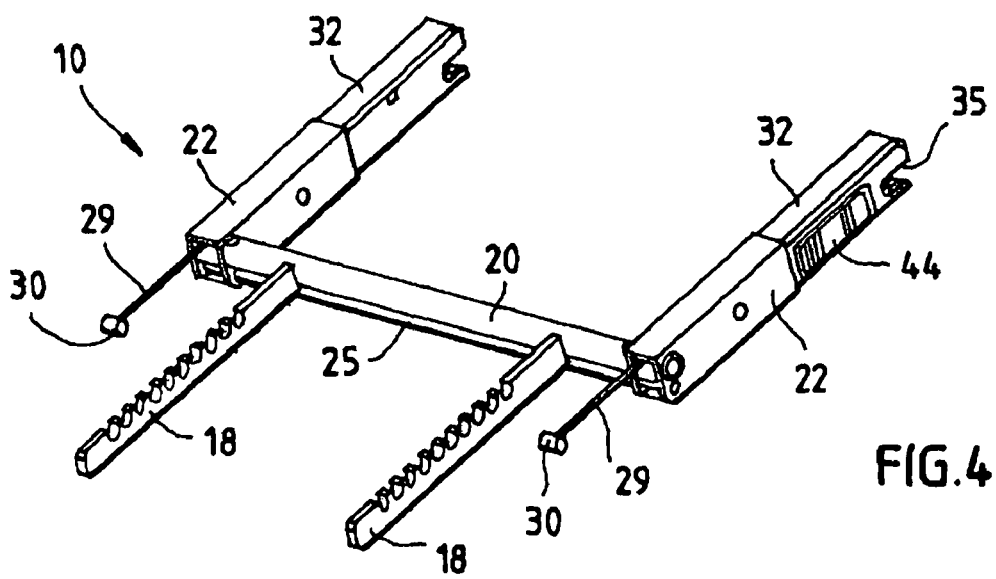
FIG. 4 is an ISOFIX adapting device according to the invention in a perspective view.

The back portion of the seating surface 2 comprises a downwardly open, bridge-like opening 9. Received therein, displaceably in the direction of travel, is the fixing device 10 of an ISOFIX anchoring device that is reproduced in FIG. 4. This is symmetrical with respect to a vertical center plane that bisects the child seat bottom section 1 in the direction of travel.

To secure this fixing device 10 to the seating surfaces/bottom section 1, provided above the bottom surface 2 thereof is a multi-offset bracket 11. This extends transversely to the direction of travel and is received in two mountings 12 in the region of the two side cheeks 3, pivotably about their connecting line oriented transversely to the direction of travel. The bracket 11 has approximately the shape of a planar, symmetrical U, with a cross member 13 and with two mutually parallel side legs 14 whose ends 15 are offset outward in antiparallel relation and in mutual alignment, and each of which is embraced by a respective mounting 12.

At least one end 15 of the bracket 11 is prolonged beyond the respective side cheek 3 and is there rotationally fixedly connected to an actuating lever 16, preferably in such a way that the actuating lever 16 extends approximately antiparallel to the nearer side leg 14. Pivoting this actuating lever 16 up or down raises the planar bracket 11 from or lowers it to the bottom surface 2.

Disposed in the front portion of the bottom surface 2, on the upper side thereof, are two approximately trough-shaped, mutually parallel, upwardly open guides 17 extending in the direction of travel, each of which opens at its back end into opening 9. Seated in each of these guides 17 is a respective toothed rack 18, which is displaceable in the longitudinal direction of the particular guide 17 as long as the cross member 13 of the bracket 11 is pivoted upward by pressing down on the lever 17 [numeral sic] and therefore leaves the region of the upward-pointing teeth of the toothed rack 18. If, conversely, lever 16 is released, then a spring 19 automatically moves the bracket 11 into its downward-pivoted position according to FIG. 1, in which its cross member 13 snaps into one of the intertooth spaces in each of the two toothed racks 18 and thereby prevents any further relative displacement of the toothed racks 18 with respect to the seating surfaces/bottom section 1.

Figure 5:
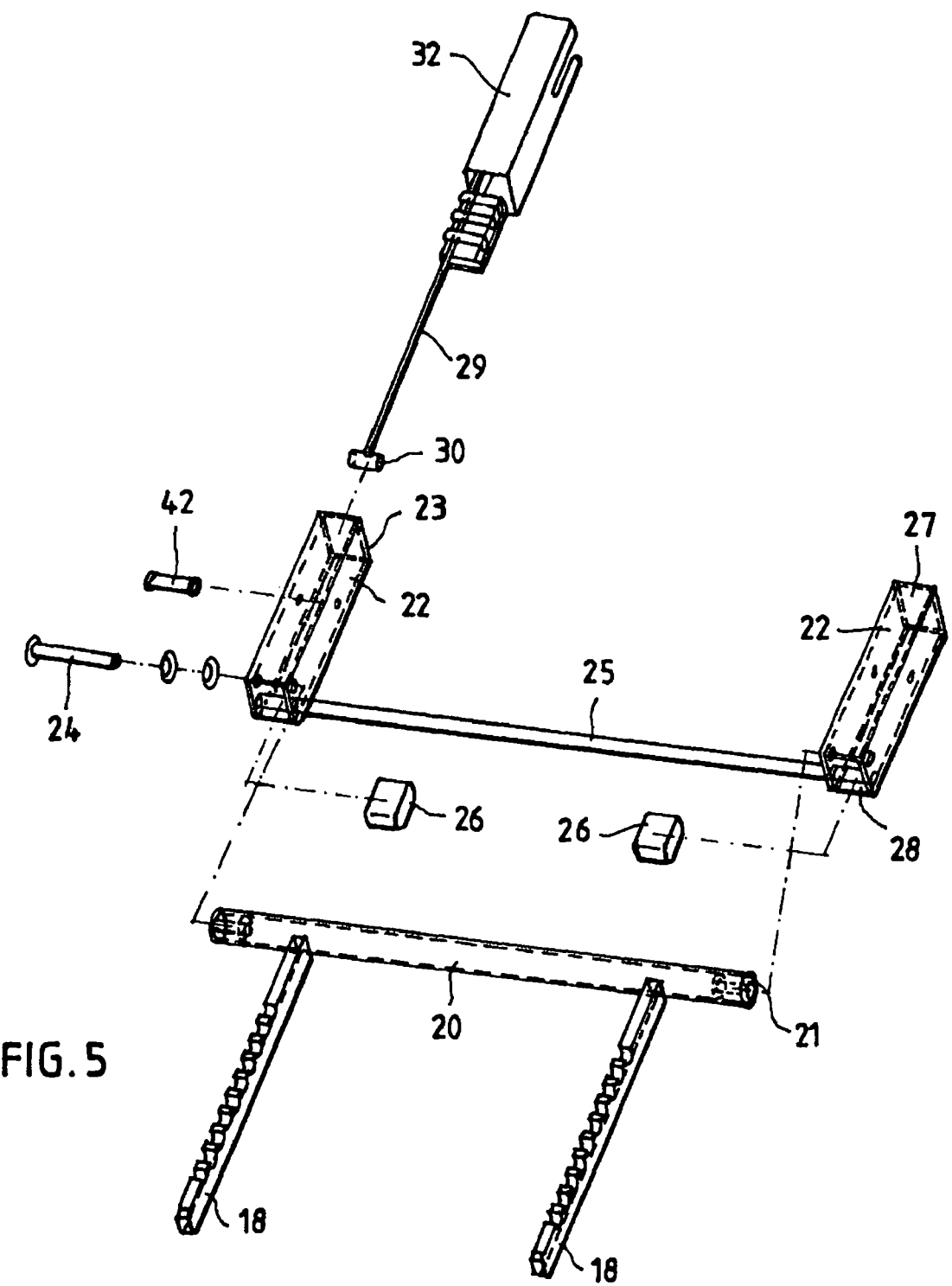
FIG. 5 is an exploded representation of the components from FIG. 4.

The two toothed racks 18 are connected to each other by a bar 20, tube or the like; see FIG. 5. In the illustrated embodiment, each of the toothed racks 18 is, by its back end, fixed flush to the cladding of the bar 20 and is there preferably permanently welded, soldered and/or glued thereto.

A respective tube 22, preferably of quadrangular cross section, is attached to each of the two end faces 21 of the bar 20, preferably by means of a screw 24 that passes through the back end of the tube 22 between its two side cheeks 23 and is screwed into an internally threaded bore in a respective bar end face 21.

To ensure parallel alignment of the two tubes 22, the latter are additionally connected to each other by a second bar 25 extending parallel to the aforesaid bar 20.

Figure 5A:
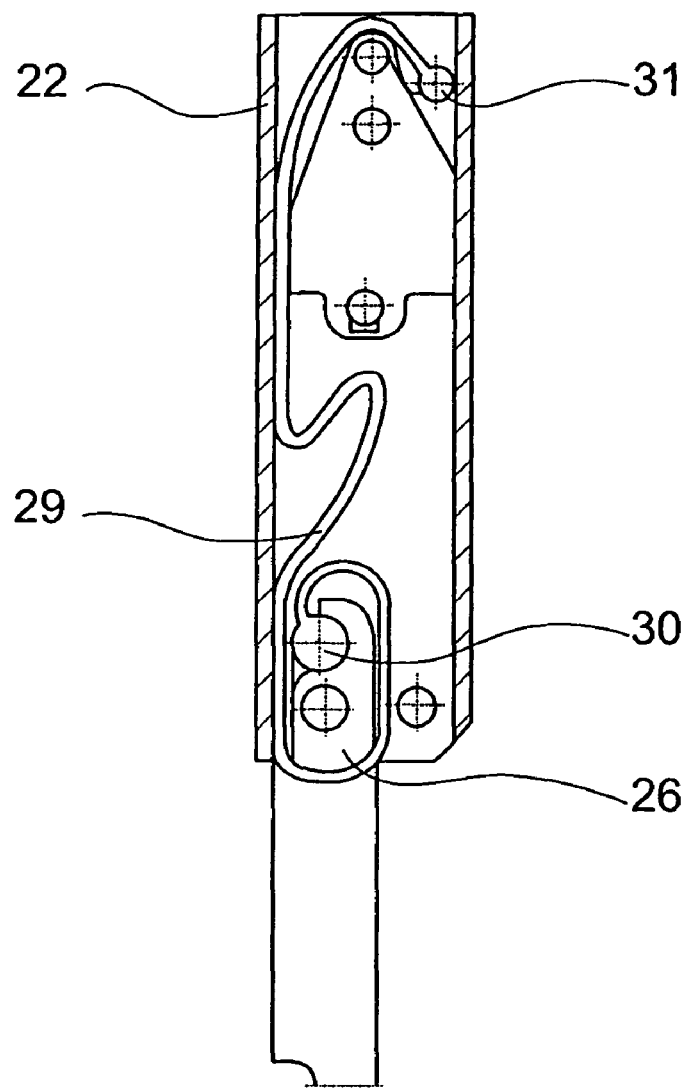
FIG. 5A is a sectional view showing portions of FIG. 4 and FIG. 5.

Disposed inside and at the back end of each tube 22 having a quadrangular cross section is a respective cylindrical and/or prismatic body 26 (FIGS. 5 and 5A) that is penetrated by the respective screw 24 and/or by the second bar 25 and is thereby held in place, specifically in such a way that it is not located close to either the top side 27 or the bottom side 28 of tube 22.

Twined around each of the two bodies 26 is a respective flexible, elongate connecting part 29 (FIG. 5A) or tensioning means, particularly in the form of a metal wire. Each end of the tensioning means or connecting part 29 is provided with a respective thickened end region 30, 31, particularly in the form of a pressed-on or molded-on, preferably metallic body, preferably of cylindrical shape with an axis of symmetry or rotation that extends transversely to the longitudinal direction of the tensioning means or connecting part 29. Whereas the tensioning means or connecting part 29 itself is able to pass through the narrow slot between the retaining body 26 and the adjacent top or bottom side 27, 28 of the tube 22, one or preferably both thickenings 30, 31 is/are too thick to get through this slot. Hence, the tensioning means or connecting part 29 can be tightened only until one of the thickened end regions 30, 31 butts against the aforementioned slot and prevents further movement.

One thickened end region 30 is preferably disposed inside the tube 22; from there, the tensioning means or connecting part 29 extends through the aforementioned slot to reach the rear, preferably open end of tube 22, is there looped halfway around the retaining body 26, thus reaching around it for about 180°, and then extends back into the tube 22 and on through it. Its opposite thickening 31 is . . . to[1] a second tube 32, also preferably of quadrangular cross section, that houses the anchoring device 33 per se.

The (quadrangular) tube 32 belonging to the anchoring device 33 and serving as a housing has the same cross section as tube 22. Its end face 34 averted from tube 22 is provided with a transversely extending slot 35 into which an ISOFIX member or ISOFIX bracket can be inserted.

The mechanism of the anchoring device 33 per se is stabilized by a metal sheet 36 bent into a U-shaped cross section, which is slid about halfway into the (quadrangular) tube 32 serving as a housing and is fixed there, for example by means of one or more screws. The two side cheeks 37 of the metal sheet 36 are not connected to each other, and protrude from (quadrangular) tube 32 serving as a housing at the end face remote from the slot 35. They can be fittingly inserted into the rear tube 22.

A filler body 38, preferably of plastic, particularly an injection-molded plastic part, is placed between the two protruding side cheeks 37. This filler body 38 need not be solid, but can instead comprise a multiplicity of stiffening webs with openings or recesses between them. It has one or more, preferably two, through-holes 39, through each of which is passed a respective rivet pin 40 that also extends through both side cheeks 37 and is riveted to them.

At its free end remote from (quadrangular) tube 32, the plastic filler body 38 is provided with two formed-on, transversely extending prolongations 41. These, in conjunction with the intervening region of the end face of the filler body 38, form an undercut region having a C-shaped cross section and a longitudinal axis that extends transversely to the mating direction.

During the mating-together of the two tubes 22, 32 of quadrangular cross section, a crosspin 42 anchored between the two side cheeks 23 of tube 22 engages in this C-shaped region of the prolongation 41 of (quadrangular) tube 32 serving as a housing. In the process, this crosspin temporarily presses the free ends of the two prolongations 41 apart until it has gotten past them and is engaged from behind by the prolongations, which have sprung back elastically. The two quadrangular tubes are now snapped together, and great force is required to pull them apart again. This limit is readily exceeded, however, during a collision accident, causing the two initially mated-together (quadrangular) tubes 22, 32 to come apart and instantaneously giving the child seat bottom section 1 additional movement play, which is used up only after the or both tensioning means or connecting parts 29 has or have become taut as a result of the linear displacement movement of the child seat bottom section 1.

In the region of the free end face 34 of the (quadrangular) tube 32 serving as a housing, the anchoring device 33 received therein has a hook-shaped part 43 which is pivotable about a transversely extending axis and which, in the downward-pivoted state, encloses the slot 35 at its front side and thereby embraces an inserted ISOFIX member or the like completely and in a way that prevents it from spontaneously detaching. By the same token, this hook-shaped part 43 can also be pivoted up out of and away from the region of the slot 35, thereby releasing the initially embraced ISOFIX member or the like. At least one spring element within the scope of the anchoring device 33 ensures that the two described states of the hook-shaped part 43—the anchoring state, in which it is pivoted into the region of the slot 35, and the releasing state, in which it is pivoted out of and away from the region of the slot 35—are stable, but the intervening transitional states are not. Under normal circumstances, therefore, the particular state that has been set is stable, whereas an intermediate state is not.

To be able to release the ISOFIX anchorage, each anchoring device 33 is provided with an actuating element 44, which is guided displaceably, particularly displaceably in the direction of travel, within a lateral, preferably elongate recess 45 in the (quadrangular) tube 32 serving as a housing for the anchoring device 33. In the state of being subjected to no external forces, said actuating element 44 is moved by a spring element into a rearward end position facing away from the direction of travel. If a person pulls actuating element 44 forward in the direction of travel, then the anchoring position of the hook-shaped part 43 becomes unstable, and the latter moves upward and thereby frees the slot 35, making it possible to detach the anchoring device 33 from an ISOFIX member or the like. The actuating elements 44 are preferably disposed on mutually averted, respectively outer side cheeks 46 of the (quadrangular) tube 32 serving as a housing, and is [sic] therefore easily accessible to a grown-up person, but not to a child in the child seat.

LIST OF REFERENCE NUMERALS

| | |
|---|---|
| 1 | Seating surfaces/bottom section |
| 2 | Bottom surface |
| 3 | Side cheek |
| 4 | Front edge |
| 5 | Back edge |
| 6 | Receptacle |
| 7 | Armrest part |
| 8 | Strutting |
| 9 | Opening |
| 10 | ISOFIX anchoring unit |
| 11 | Bracket |
| 12 | Mounting |
| 13 | Cross member |
| 14 | Side leg |
| 15 | End |
| 16 | Lever |
| 17 | Guide |
| 18 | Toothed rack |
| 19 | Spring |
| 20 | Bar/tube |
| 21 | End face |
| 22 | Quadrangular tube |
| 23 | Side cheek |
| 24 | Screw |
| 25 | Bar |
| 26 | Retaining body |
| 27 | Top side |
| 28 | Bottom side |
| 29 | Metal wire |
| 30 | Thickened end region |
| 31 | Thickened end region |
| 32 | Quadrangular tube |
| 33 | Anchoring device |
| 34 | End face |
| 35 | Slot |
| 36 | Metal sheet |
| 37 | Side cheek |
| 38 | Filler body |
| 39 | Recess[2] |
| 40 | Rivet pin |
| 41 | Prolongation |
| 42 | Crosspin |
| 43 | Hook |
| 44 | Actuating element |
| 45 | Recess |
| 46 | Side cheek |

[2]Translator's Note:
In the body of a patent, element 39 is identified as a through-hole (Durchbrechung).

The invention claimed is:

1. A device for releasably attaching a child seat to at least one anchor member or cross member of an anchor bracket, the anchor member or cross member being connected to a body of a vehicle and extending transversely to a direction of travel, said device comprising a fixing device for connection to and/or integration with the child seat and at least one anchoring device for embracing the anchor member in such a way that radial movement of the child seat relative to the anchor member or cross member of an anchor bracket is impossible and axial movement is possible only within narrow limits; wherein said fixing device and said at least one anchoring device are disposed on and/or in first and second tubes which can be fitted together for normal use in such a way that relative motion between the two tubes is limited to the play of a fitted connection, the connection being adapted to come apart under a force overload, the tubes being connected inseparably to each other by a flexible but not stretchable connecting part, such that when the fitted connection releases, the tubes are capable of relative motion within a different perimeter than in the fitted-together state, this relative motion being limited by a free length of the flexible connecting part;

wherein the flexible connecting part has an elongate shape in the form of a wire;

wherein said flexible connecting part is provided at each end with a thickened end region that is secured to said first tube of said fixing device, and/or to said second tube, of said anchoring device.

2. The device as in claim 1, wherein said flexible connecting part extends within said connection between said tubes.

3. The device as in claim 2, wherein said anchoring device comprises a movable, pivotable, hook-shaped part operative to engage behind the anchor member or cross member of said anchor bracket affixed to the vehicle body, which part extends transversely to a direction of travel.

4. The device as in claim 3, wherein said movable, pivotable, hook-shaped part of said anchoring device has two stable states, a first state in which said part is snapped onto a bracket and a second state in which said part is pivoted backward and detached from the anchor member.

5. The device as in claim 4, wherein at least one spring element is operative to keep said movable, pivotable, hook-shaped part stable.

6. The device as in claim 5, wherein disposed on said anchoring device is an actuating element whose actuation renders the state of being snapped onto a bracket unstable, such that said movable, pivotable, hook-shaped part pivots backward and detaches from an anchor member.

7. The device as in claim 6, wherein said actuating element comprises a sliding element.

8. The device as in claim 3, wherein anchoring devices are connected to each other by at least one member extending transversely to the direction of travel.

9. The device as in claim 8, wherein the at least one transversely extending member is configured as a selected one of a bar, a tube, and a sleeve in a region between said two tubes that can be mated together with said anchoring devices.

10. The device as in claim 9, wherein at least one tube or bar extending transversely to the direction of travel is provided with two fastening elements extending radially therefrom.

11. The device as in claim 10, wherein at least one fastening element is configured as a toothed rack.

12. The device as in claim 11, wherein a bracket is disposed on said child seat and can be pivoted or slid into a tooth region of said toothed rack.

13. A device for releasably attaching a child seat to at least one anchor member or cross member of an anchor bracket, the anchor member or cross member being connected to a body of a vehicle and extending transversely to a direction of travel, the device comprising:

a fixing device for connection to and/or integration with the child seat;

at least one anchoring device for embracing the anchor member or cross member in such a way that radial movement of the child seat relative to the anchor member or cross member is impossible and axial movement is possible only within narrow limits;

at least a first tube and a second tube, wherein said fixing device is disposed on and/or in said first tube and said at least one anchoring device is disposed on and/or in said second tube, wherein said fixing device and said at least one anchoring device can be fitted together to form a fitted connection for normal use in such a way that a relative motion between said first tube and said second tube is limited to a play of said fitted connection, said fitted connection being adapted to come apart in a case of sudden deceleration;

at least one body member disposed inside of, and held in place in, said first tube;

at least a flexible but not stretchable connecting part twined about said at least one body member;

wherein said first tube and said second tube are connected inseparably to each other by said flexible but not stretchable connecting part such that when the fitted connection releases in the case of sudden deceleration, said first tube and said second tube are capable of a relative motion within a different perimeter than in the state of forming said fitted connection, the relative motion being limited by a free length of said flexible but not stretchable connecting part.

14. The device as in claim 13, wherein said flexible connecting part has an elongate shape in the form of a wire.

15. The device as in claim 14, wherein said flexible connecting part is provided at each end with a thickened end region that is secured to said first tube of said fixing device, and/or to said second tube, of said anchoring device.

16. The device as in claim 15, wherein said flexible connecting part extends within said connection between said tubes.

* * * * *